United States Patent
Gibson

(10) Patent No.: US 10,499,621 B1
(45) Date of Patent: Dec. 10, 2019

(54) MINNOW TRAPS

(71) Applicant: Bobbie Gibson, Many, LA (US)

(72) Inventor: Bobbie Gibson, Many, LA (US)

( * ) Notice: Subject to any disclaimer, the term of this patent is extended or adjusted under 35 U.S.C. 154(b) by 0 days.

(21) Appl. No.: 16/273,894

(22) Filed: Feb. 12, 2019

(51) Int. Cl.
A01K 69/08 (2006.01)
A01K 69/06 (2006.01)
A01K 69/10 (2006.01)
A01K 97/05 (2006.01)
A01K 63/02 (2006.01)
A01K 61/95 (2017.01)
A01K 85/01 (2006.01)
A01K 85/18 (2006.01)

(52) U.S. Cl.
CPC .............. A01K 69/10 (2013.01); A01K 63/02 (2013.01); A01K 69/06 (2013.01); A01K 69/08 (2013.01); A01K 97/05 (2013.01); A01K 61/95 (2017.01); A01K 85/01 (2013.01); A01K 85/18 (2013.01); B62B 2202/402 (2013.01)

(58) Field of Classification Search
CPC ........ A01K 69/00; A01K 69/06; A01K 69/08; A01K 69/10
USPC ..................................... 43/100, 105
See application file for complete search history.

(56) References Cited

U.S. PATENT DOCUMENTS

| 521,053 A | * | 6/1894 | Seaton | A01M 21/00 43/65 |
| 846,556 A | * | 3/1907 | Dollar | A01K 69/06 43/100 |
| 1,544,213 A | * | 6/1925 | Brautigam | A01M 23/00 43/65 |
| 1,638,238 A | * | 8/1927 | Brautigam | A01K 69/06 43/105 |
| 1,887,059 A | * | 11/1932 | Kraus | A01K 69/08 43/105 |
| 2,123,471 A | * | 7/1938 | Lewis | A01M 23/00 43/100 |
| 2,219,981 A | * | 10/1940 | Doan | A01K 69/06 43/100 |
| 2,316,888 A | * | 4/1943 | Schreyer | A01K 69/06 43/66 |
| 2,536,281 A | * | 1/1951 | Hamel | A01K 69/06 220/6 |

(Continued)

FOREIGN PATENT DOCUMENTS

| CA | 2964816 A1 | * | 10/2018 | ............. A01K 69/08 |
| CA | 3002094 A1 | * | 10/2018 | ............. A01K 69/08 |

(Continued)

Primary Examiner — Darren W Ark
(74) Attorney, Agent, or Firm — R. Keith Harrison

(57) ABSTRACT

Minnow traps suitable for trapping minnows may include a pair of spaced-apart, minnow-accessible side trap compartments. A minnow-accessible front trap compartment and a minnow-accessible rear trap compartment may be disposed between the side trap compartments. The front trap compartment and the rear trap compartment may be disposed in spaced-apart relationship to each other. At least one central bait compartment may be disposed between and communicate with the side trap compartments and between and communicate with the front trap compartment and the rear trap compartment. The at least one central bait compartment may be configured to contain a supply of bait.

17 Claims, 9 Drawing Sheets

(56) References Cited

U.S. PATENT DOCUMENTS

| | | | | |
|---|---|---|---|---|
| 2,576,524 A * | 11/1951 | Lewis | A01K 69/06 | 43/100 |
| 2,726,478 A * | 12/1955 | Pullen | A01K 69/08 | 43/100 |
| 2,731,761 A * | 1/1956 | Marshall | A01K 69/08 | 220/4.28 |
| 2,736,986 A * | 3/1956 | Goldstein | A01K 69/06 | 43/103 |
| 2,769,274 A * | 11/1956 | Ougland | A01K 69/08 | 43/105 |
| 2,908,993 A * | 10/1959 | Webb | A01K 69/08 | 43/102 |
| 3,337,982 A * | 8/1967 | Sajulan | A01K 69/08 | 43/100 |
| 3,497,989 A * | 3/1970 | Manno | A01K 69/08 | 43/100 |
| 3,906,655 A * | 9/1975 | Lowenthal, Jr. | A01K 69/08 | 43/100 |
| 3,916,558 A * | 11/1975 | Crouch | A01K 69/08 | 43/65 |
| 4,030,232 A * | 6/1977 | Niva | A01K 69/08 | 43/105 |
| 4,044,493 A * | 8/1977 | Fox | A01K 69/06 | 43/105 |
| 4,177,601 A * | 12/1979 | Morton | A01K 69/08 | 43/102 |
| 4,424,641 A * | 1/1984 | Kyte | A01K 69/08 | 119/208 |
| 4,434,575 A * | 3/1984 | Pearson | A01K 69/06 | 43/100 |
| 4,509,288 A * | 4/1985 | Shepherd | A01K 69/08 | 43/102 |
| 4,604,823 A * | 8/1986 | Ponzo | A01K 69/10 | 43/105 |
| 4,831,773 A * | 5/1989 | Rostrom | A01K 80/00 | 43/100 |
| 5,259,809 A * | 11/1993 | Rainey, Jr. | A01K 69/06 | 119/213 |
| 5,353,541 A * | 10/1994 | Jonason | A01K 69/10 | 43/100 |
| 5,839,220 A * | 11/1998 | Wass | A01K 69/10 | 43/105 |
| 6,000,168 A * | 12/1999 | Demusz | A01K 69/06 | 43/55 |
| 6,035,575 A * | 3/2000 | Hilty | A01K 69/06 | 43/100 |
| 6,804,911 B1 * | 10/2004 | Henke | A01K 69/06 | 43/100 |
| 7,111,427 B1 * | 9/2006 | Gaughen | A01K 69/06 | 43/100 |
| 9,781,910 B1 * | 10/2017 | Burrell | A01K 69/08 | |
| 10,117,422 B2 * | 11/2018 | Hunt | A01K 69/08 | |
| 2004/0181995 A1 * | 9/2004 | Cheramie | A01K 69/10 | 43/105 |
| 2005/0223624 A1 * | 10/2005 | Gaughen | A01K 69/06 | 43/100 |
| 2006/0042065 A1 * | 3/2006 | Matherne | A01K 69/06 | 29/428 |
| 2010/0313465 A1 * | 12/2010 | Haugen | A01K 69/06 | 43/102 |
| 2013/0205646 A1 * | 8/2013 | McPhee | A01K 69/10 | 43/105 |
| 2014/0305026 A1 * | 10/2014 | Pemberton | A01K 69/06 | 43/100 |
| 2016/0106079 A1 * | 4/2016 | Best | A01K 69/10 | 43/102 |
| 2017/0231206 A1 * | 8/2017 | Park | A01K 61/95 | 43/105 |
| 2018/0303077 A1 * | 10/2018 | Dauphinee | A01K 69/08 | |
| 2019/0191679 A1 * | 6/2019 | Scaglione | A01K 69/10 | |

FOREIGN PATENT DOCUMENTS

| | | | |
|---|---|---|---|
| KR | 20100033640 A | * | 3/2010 |
| KR | 20100042951 A | * | 4/2010 |
| KR | 20110009508 U | * | 10/2011 |

* cited by examiner

MINNOW TRAPS

FIELD

Illustrative embodiments of the disclosure generally relate to minnow traps suitable for trapping minnows. More particularly, illustrative embodiments of the disclosure relate to minnow traps having a central feed compartment into which feed can be placed to lure minnows into the trap.

SUMMARY

Illustrative embodiments of the disclosure are generally directed to minnow traps suitable for trapping minnows. An illustrative embodiment of the minnow traps may include a pair of spaced-apart, minnow-accessible side trap compartments. A minnow-accessible front trap compartment and a minnow-accessible rear trap compartment may be disposed between the side trap compartments. The front trap compartment and the rear trap compartment may be disposed in spaced-apart relationship to each other. At least one central bait compartment may be disposed between and communicate with the side trap compartments and between and communicate with the front trap compartment and the rear trap compartment. The at least one central bait compartment may be configured to contain a supply of bait.

BRIEF DESCRIPTION OF THE DRAWINGS

Illustrative embodiments of the disclosure will now be described, by way of example, with reference to the drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 8:
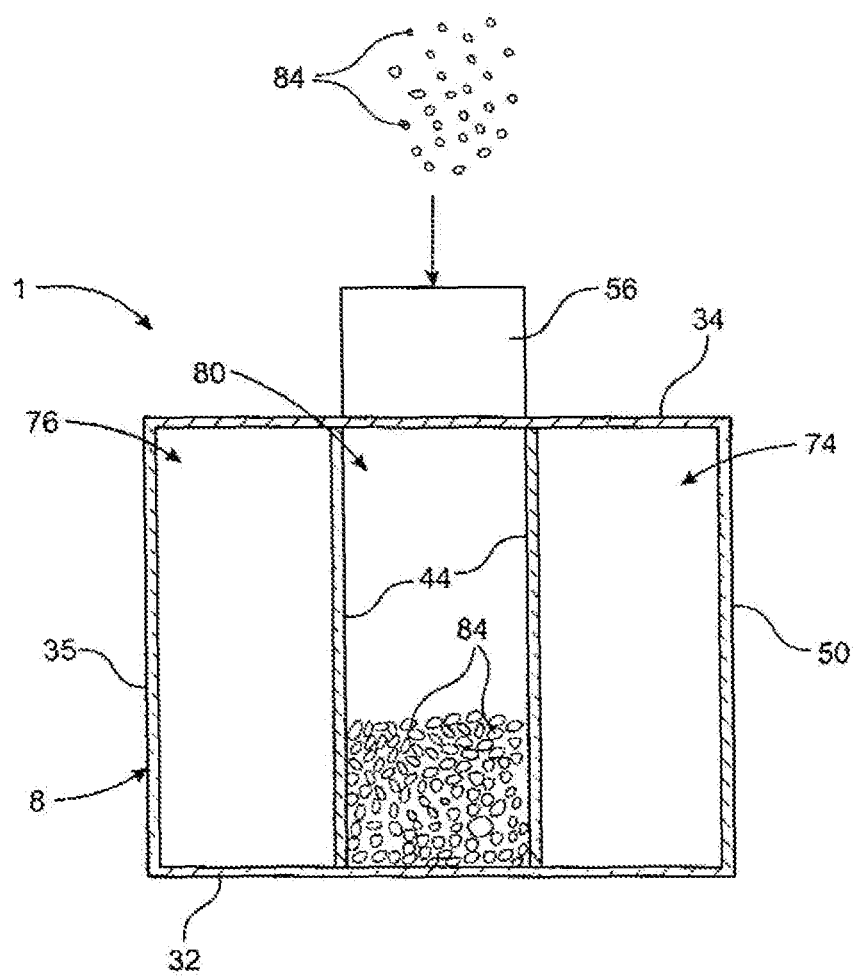
FIG. 8 is a side cross-sectional view of the central bait compartment and the front and rear trap compartments of the illustrative minnow trap, more particularly illustrating typical placement of bait in the bait compartment preparatory to use of the minnow trap.
Figure 9:
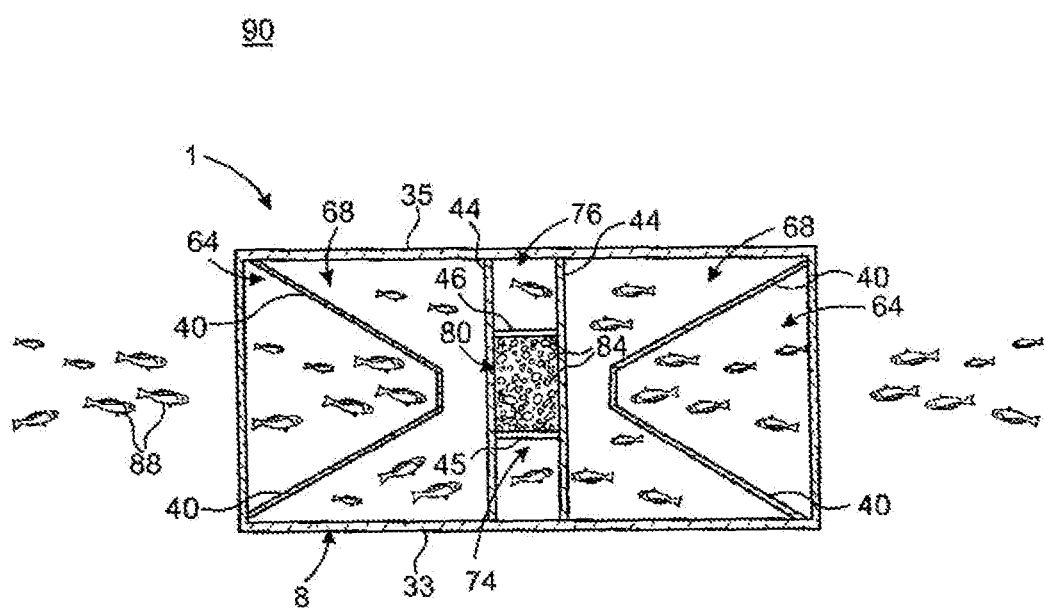
FIG. 9 is a top longitudinal sectional view of the illustrative minnow trap, submerged in a body of water, with the bait contained in the bait compartment and minnows swimming from the body of water into the minnow trap as the bait lures the minnows into the trap.

Referring initially to FIGS. 8 and 9 of the drawings, an illustrative embodiment of the minnow traps is generally indicated by reference numeral 1. The minnow trap 1 may include at least one central bait compartment 80. In typical application, which will be hereinafter described, bait 84 may be placed in the central bait compartment 80. The baited minnow trap 1 may be placed in a body of water 90 (FIG. 9) to attract and lure minnows 88 into the minnow trap 1. The centralized location of the bait compartment 80 may facilitate effective luring and trapping of the minnows 88 in the minnow trap 1 typically for subsequent use of the minnows 88 as fishing bait. The minnow trap 1 may be fabricated of steel, aluminum and/or other metals, plastic, composites and/or other materials which are consistent with the functional requirements of the minnow trap 1.

Referring next to FIGS. 1-7 of the drawings, the minnow trap 1 may include a pair of spaced-apart side trap compartments 68. A front trap compartment 74 and a rear trap compartment 76 may be disposed in spaced-apart relationship to each other and between and in communication with the side trap compartments 68. Each of the side trap compartments 68, the front trap compartment 74 and the rear trap compartment 76 may be accessible to the minnows 88 from the body of water 90, typically as will be hereinafter described. The central bait compartment 80 may be disposed between and in communication with the side trap compartments 68 and between and in communication with the front trap compartment 74 and the rear trap compartment 76. The central bait compartment 80 may be sized and configured to accommodate a supply of the bait 84 (FIGS. 8 and 9).

At least one bait compartment door 56 may reversibly close the central bait compartment 80. At least one trap compartment door 50 may reversibly close at least one of the side trap compartments 68, the front trap compartment 74 and the rear trap compartment 76. In use of the minnow trap 1, which will be hereinafter further described, the bait compartment door 56 may be opened to place a supply of the bait 84 (FIG. 8) in the central bait compartment 80 prior to placement of the minnow trap 1 in the body of water 90. After use, the trap compartment door 50 may be opened to remove the trapped minnows 88 from the minnow trap 1.

In some embodiments, at least one minnow entrance 64 may extend into and communicate with at least one of the side trap compartments 68 for purposes which will be hereinafter described. In some embodiments, a pair of minnow entrances 64 may extend into and communicate with the respective trap compartments 68 of the minnow trap frame 2, as illustrated.

In some embodiments, the side trap compartments 68, the front trap compartment 74, the rear trap compartment 76 and the central bait compartment 80 may be contained in a minnow trap frame 2. In some embodiments, the minnow trap frame 2 may be elongated and rectangular, as illustrated. In other embodiments, the minnow trap frame 2 may have other shapes. The minnow trap frame 2 may include an elongated bottom front frame member 3. An elongated top front frame member 4 may be disposed in parallel, spaced-apart relationship with respect to the bottom front frame member 3. An elongated bottom rear frame member 5 may be disposed in parallel, spaced-apart relationship to the bottom front frame member 3. An elongated top rear frame member 6 may be disposed in parallel, spaced-apart relationship to the top front frame member 4.

A pair of parallel, spaced-apart front side frame members 10 may connect the top front frame member 4 to the bottom front frame member 3. A pair of parallel, spaced-apart rear side frame members 11 may connect the top rear frame member 6 to the bottom rear frame member 5. A pair of parallel, spaced-apart bottom side frame members 12 may connect the bottom rear frame member 5 to the bottom front frame member 3. A pair of parallel, spaced-apart top side frame members 13 may connect the top rear frame member 6 to the top front frame member 4.

Figure 1:
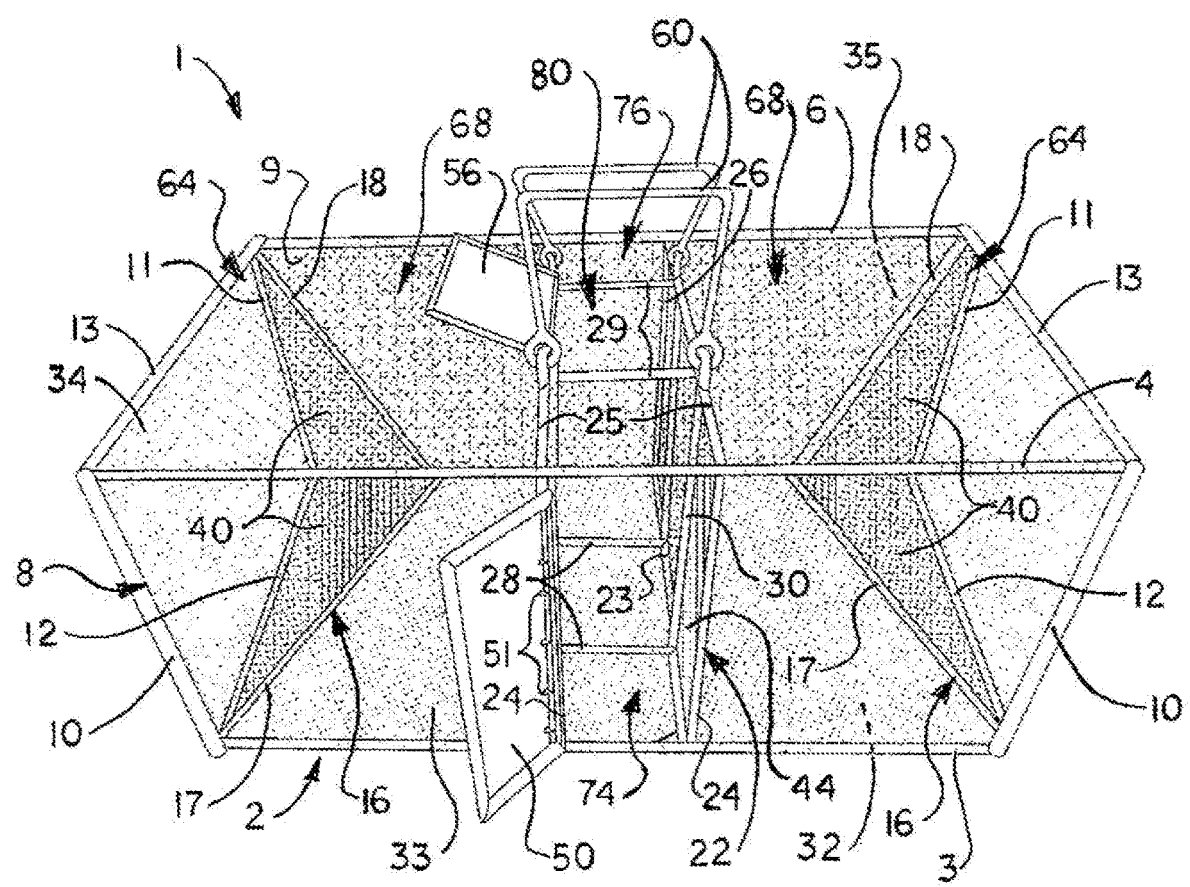
FIG. 1 is a front perspective view of an illustrative embodiment of the minnow traps.
Figure 2:
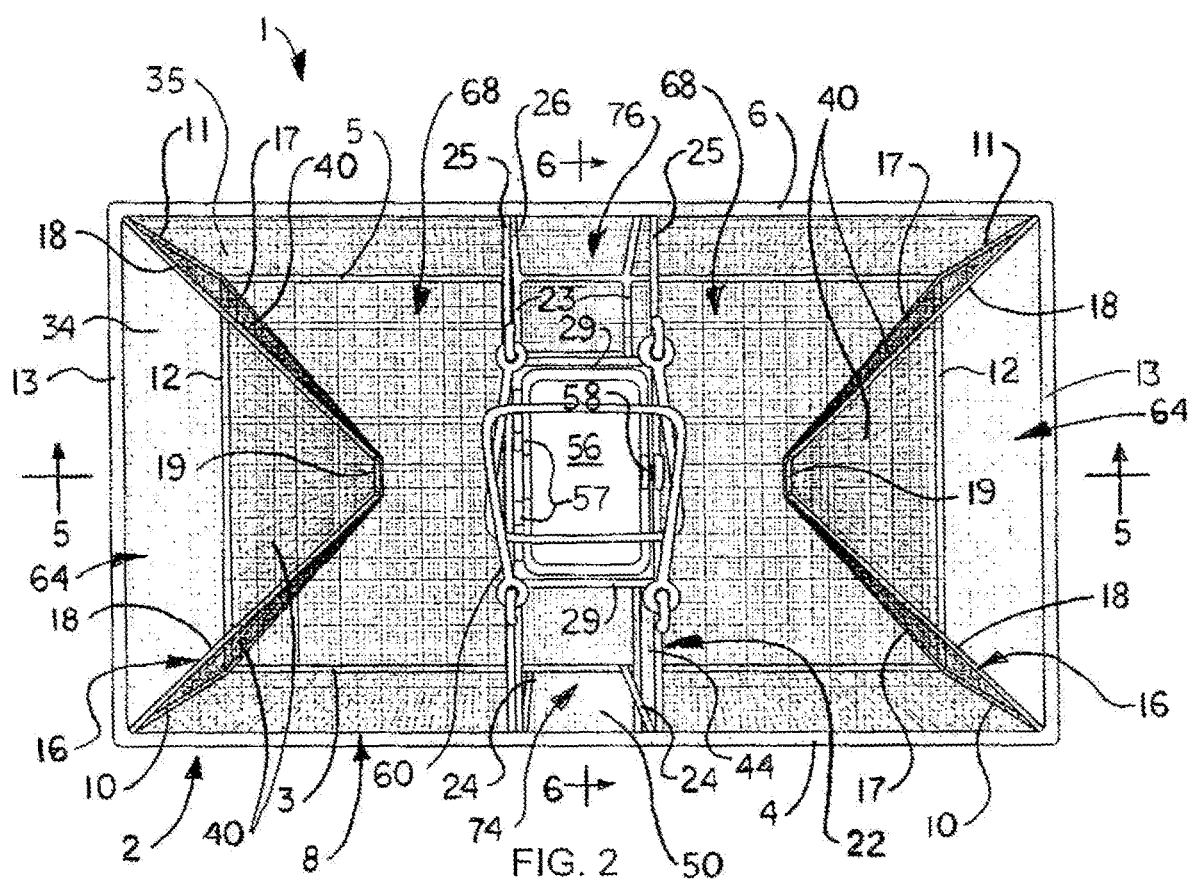
FIG. 2 is a top view of the illustrative minnow trap.
Figure 3:
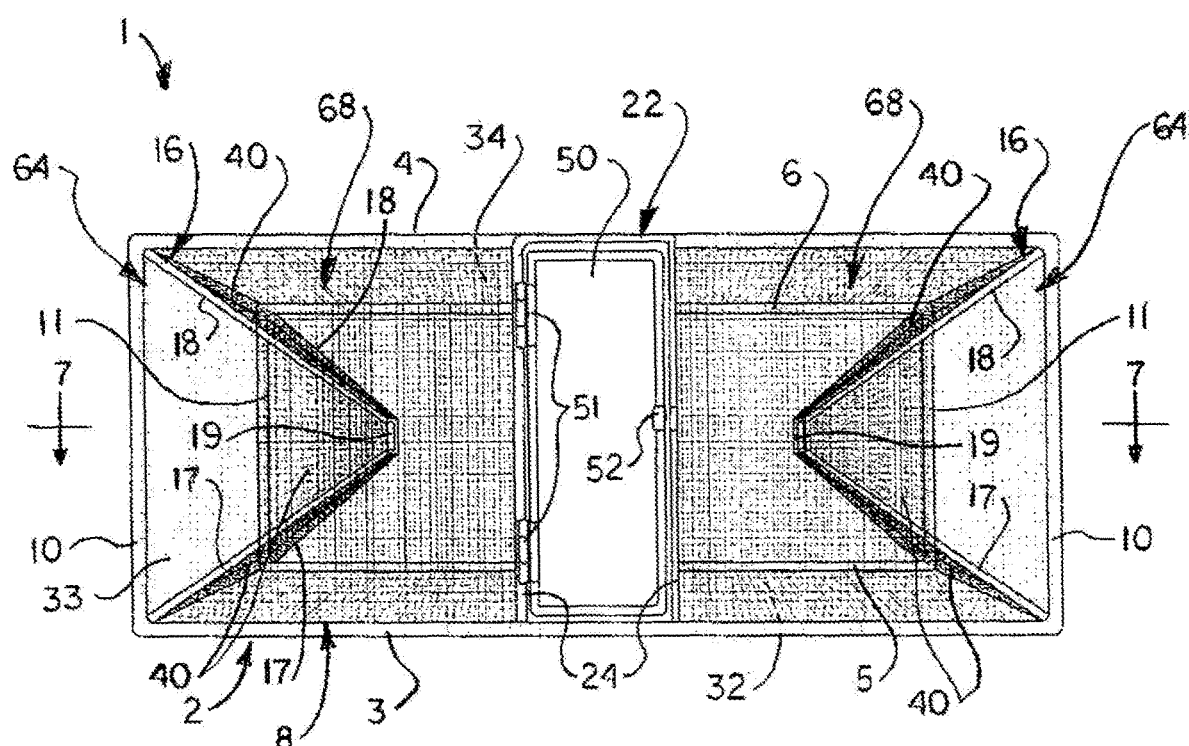
FIG. 3 is a front view of the illustrative minnow trap.

A mesh covering 8 may be disposed on the minnow trap frame 2. The mesh covering 8 may include mesh openings 9 (FIG. 1). In some embodiments, each mesh opening 9 may have a width of ¼". In other embodiments, each mesh opening 9 may be larger or smaller. In some embodiments, the mesh covering 8 may include a bottom trap panel 32 on the bottom front frame member 3, the bottom rear frame member 5 and the bottom side frame members 12. A front trap panel 33 may be disposed on the bottom front frame member 3, the top front frame member 4 and the front side frame members 10. A top trap panel 34 may be disposed on the top front frame member 4, the top rear frame member 6 and the top side frame members 13. A rear trap panel 35 may be disposed on the bottom rear frame member 5, the top rear frame member 6 and the rear side frame members 11.

In some embodiments, the minnow trap frame 2 may include a pair of minnow entrance frame portions 16 which form the supporting framework for the respective minnow entrances 64. Each minnow entrance frame portion 16 may include a pair of angled bottom minnow entrance frame members 17 and a pair of angled top minnow entrance frame members 18. Each bottom minnow entrance frame member 17 may extend from the junction of the bottom front frame member 3 or bottom rear frame member 5 with each corresponding front side frame member 10 or rear side frame member 11. Each top minnow entrance frame member 18 may angle from the junction of the top front frame member 4 or top rear frame member 6 and each corresponding front side frame member 10 or rear side frame member 11. The bottom minnow entrance frame members 17 and the top minnow entrance frame members 18 may terminate on a minnow entrance frame ring 19 inside the corresponding side trap compartment 68. In some embodiments, each minnow entrance frame ring 19 may be 1" in diameter. Mesh minnow entrance panels 40 may be disposed on each minnow entrance frame portion 16.

In some embodiments, the minnow trap frame 2 may include a center frame portion 22 between the side trap compartments 68. The front trap compartment 74, the rear trap compartment 76 and the central bait compartment 80 may be contained in the center frame portion 22.

Figure 4:
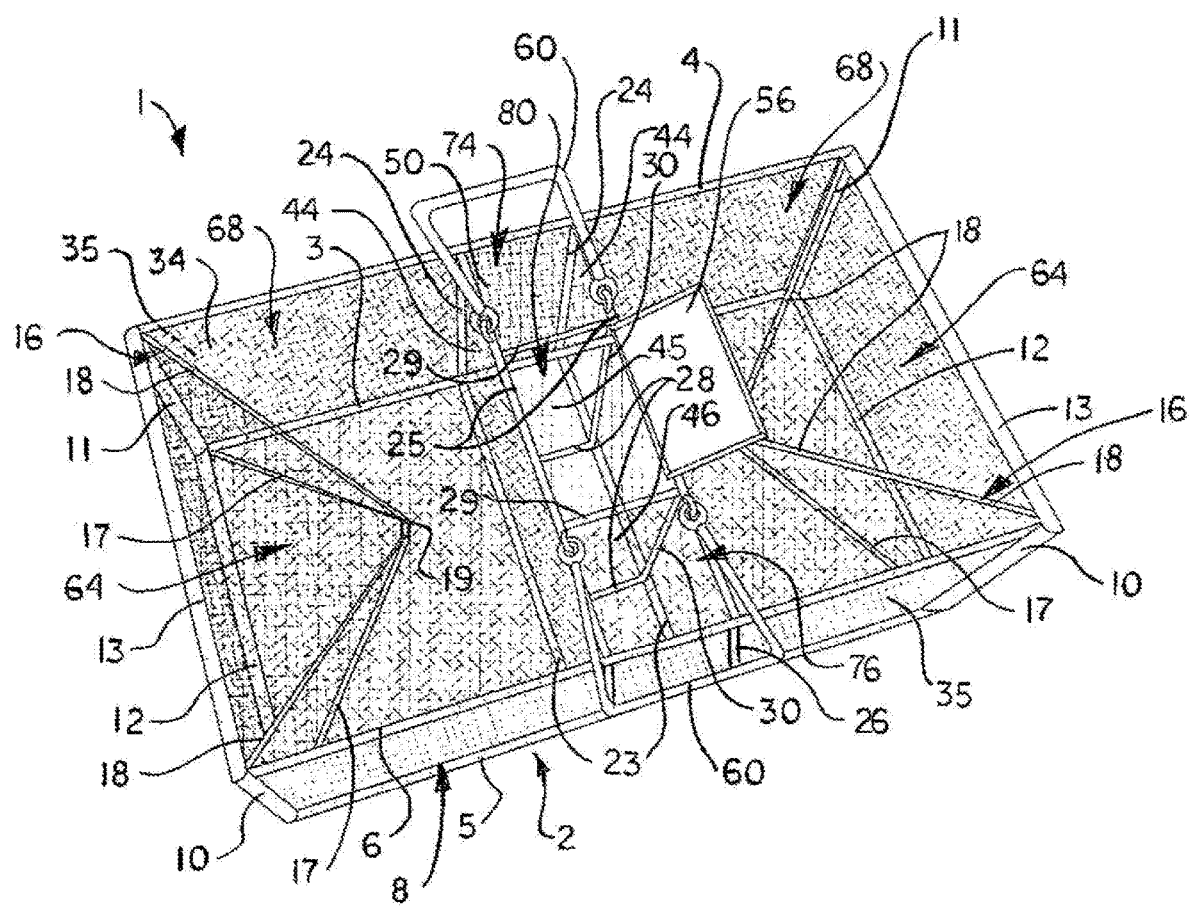
FIG. 4 is a rear perspective view of the illustrative minnow trap.
Figure 5:
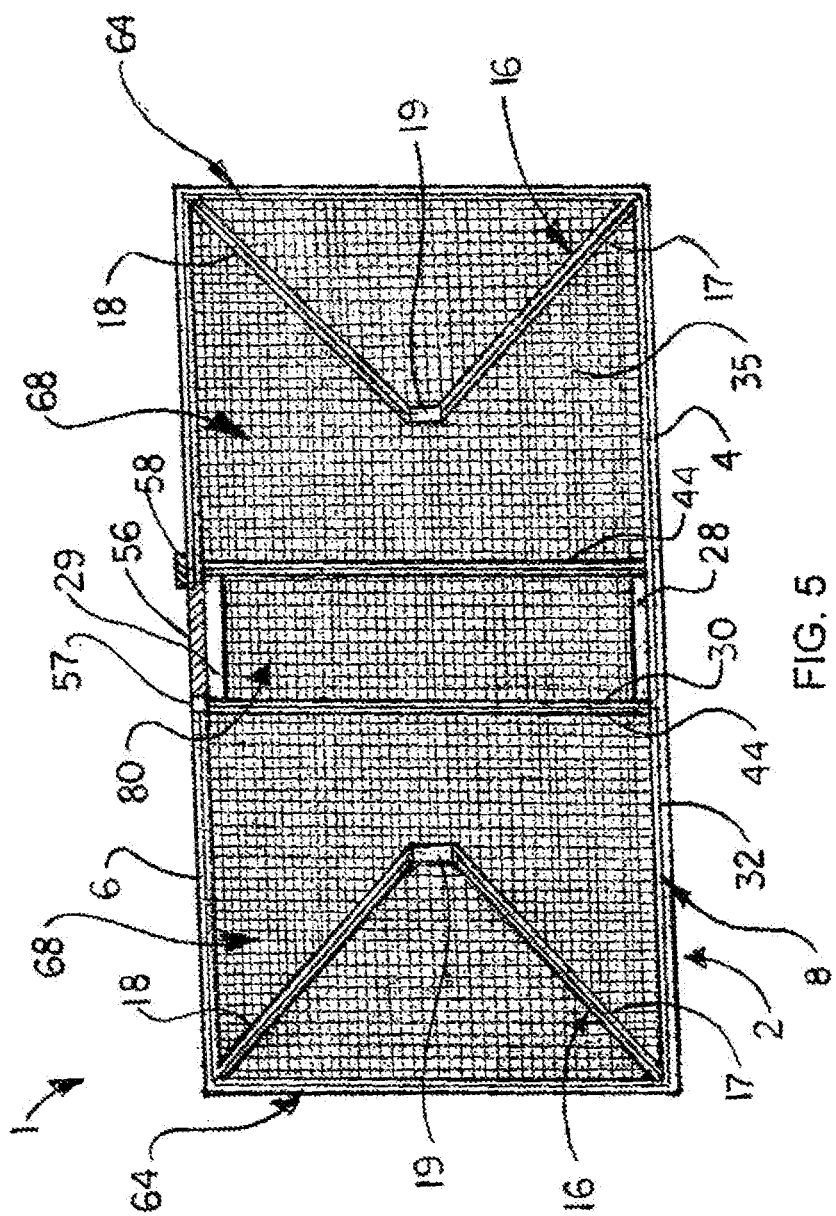
FIG. 5 is a longitudinal front sectional view, taken along section lines 5-5 in FIG. 2, of the illustrative minnow trap, with the carrying handles omitted for brevity.
Figure 6:
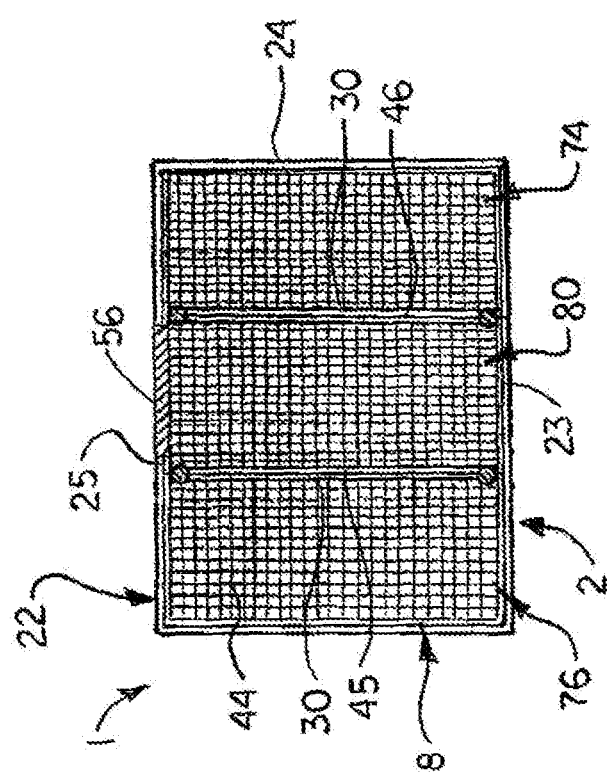
FIG. 6 is a cross-sectional view, taken along section lines 6-6 in FIG. 2, of the illustrative minnow trap, with the carrying handles omitted for brevity.
Figure 7:
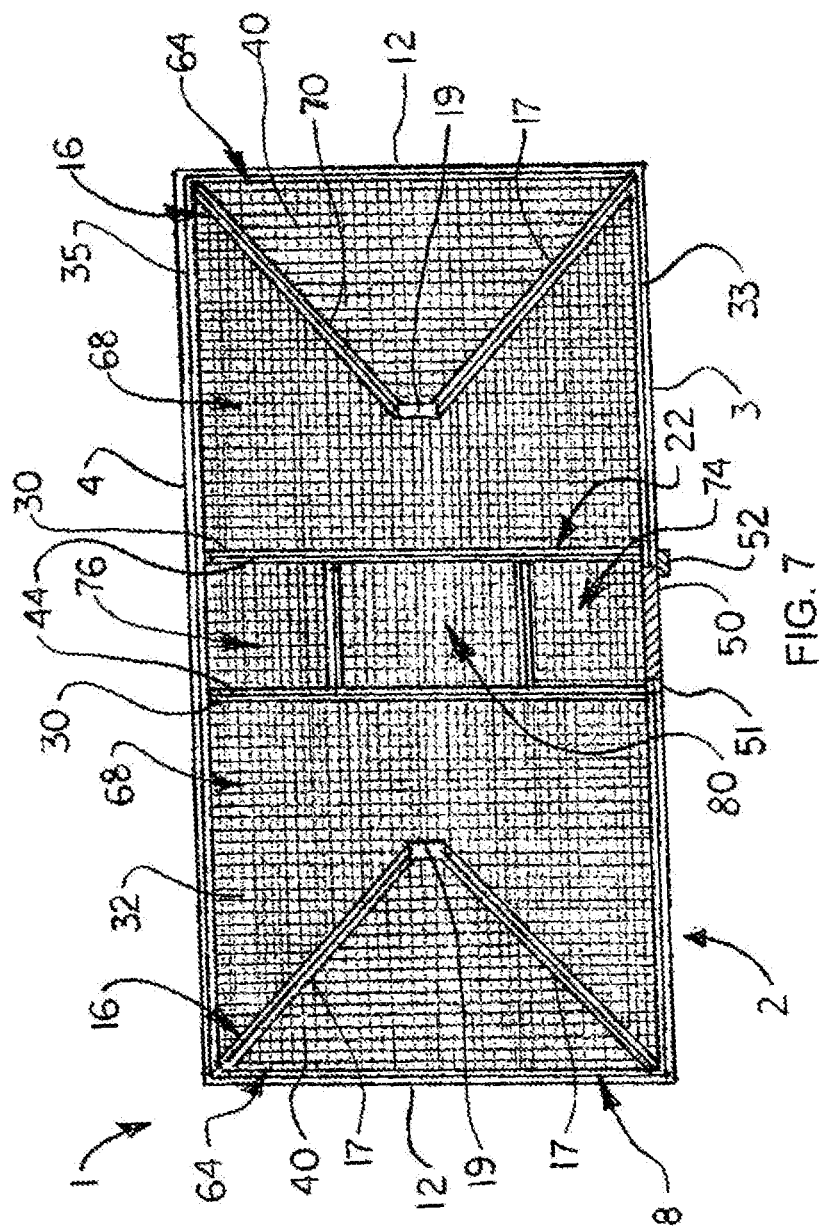
FIG. 7 is a longitudinal top sectional view, taken along section lines 7-7 in FIG. 3, of the illustrative minnow trap.

As particularly illustrated in FIG. 4, the center frame portion 22 may include a pair of elongated, parallel, spaced-apart bottom center frame members 23 extending between the bottom front frame member 3 and the bottom rear frame member 5 of the minnow trap frame 2. A pair of elongated, parallel, spaced-apart top center frame members 25 may extend between the top front frame member 4 and the top rear frame member 6 of the minnow frame 2 in spaced-apart, parallel relationship to the bottom center frame members 23, respectively. A pair of elongated, parallel, spaced-apart front center frame members 24 may extend between the bottom center frame members 23 and the top center frame members 25, respectively, at the bottom front frame member 3 and top front frame member 4. A pair of elongated, parallel, spaced-apart rear center frame members 26 may extend between the bottom center frame members 23 and the top center frame members 25, respectively, at the bottom rear frame member 5 and top rear frame member 6.

A pair of elongated, parallel, spaced-apart bottom bait compartment members 28 may extend between the bottom center frame members 23. A pair of elongated, parallel, spaced-apart top bait compartment members 29 may extend between the top center frame members 25 in parallel, spaced-apart relationship to the bottom bait compartment members 28, respectively.

A pair of parallel, spaced-apart mesh side compartment panels 44 may extend between each bottom center frame members 23 and corresponding top center frame member 25. A mesh bait compartment front panel 45 and a bait compartment rear panel 46 may extend between each bottom bait compartment member 28 and corresponding top bait compartment member 29. Accordingly, the central bait compartment 80 may be formed by and between the bottom trap panel 32, the side compartment panels 44, the bait compartment front panel 45 and the bait compartment rear panel 46.

In some embodiments, the bait compartment door 56 may be pivotally attached to one of the top center frame members 25 via at least one door hinge 57. A releasable door latch 58 may selectively secure the bait compartment door 56 in a closed position.

In some embodiments, the trap compartment door 50 may be pivotally attached to one of the front center frame members 24 of the center frame portion 22 via at least one door hinge 51. A releasable door latch 52 may selectively secure the trap compartment door 50 in a closed position. Accordingly, the front trap compartment 74 may be formed by and between the bottom trap panel 32, the trap compartment door 50, the side compartment panels 44 and the bait compartment front panel 45. The rear trap compartment 76 may be formed by and between the bottom trap panel 32, the rear trap panel 35, the side compartment panels 44 and the bait compartment rear panel 46.

In some embodiments, the minnow trap frame 2 may include at least one carrying handle 60 to enable a user to carry the minnow trap 1. Accordingly, a pair of carrying handles 60 may be pivotally attached to the respective top center frame members 25 of the center frame portion 22.

Referring again to FIGS. 8 and 9 of the drawings, in typical application, the bait compartment door 56 may be opened by releasing the door latch 58 and pivoting the bait compartment door 56 on the door hinges 57. A supply of bait 84 may be placed in the opened central bait compartment 80, as illustrated in FIG. 8, and the bait compartment door 56 closed and latched. The bait 84 may be any type of bait which can be confined in the bait compartment 80 to attract the minnows 88 from the body of water 90. In some applications, the bait 84 may include particulate catfish feed or pet food, for example and without limitation. The minnow trap 1 may then be transported to and submerged in a body of water 90 such as a lake, river or stream, as illustrated in FIG. 9. The bait 84 may lure the minnows 88 from the body of water 90 into the side trap compartments 68, front trap compartment 74 and rear trap compartment 76 typically through the main entrance frame ring 19 of each minnow entrance 64. The inward-protruding configuration of the minnow entrances 64 may hinder the minnows 88 from swimming out of the side trap compartments 68 after entry.

The minnow trap 1 may be removed from the body of water 90 typically by grasping the carrying handles 60. As the minnow trap 1 is lifted from the body of water 90, the water may exit the side trap compartments 68, the front trap compartment 74 and the rear trap compartment 76 through the mesh openings 9 in the mesh covering 8. The mesh covering 8 may retain most of the Applicant: Bobbie Gibson trapped minnows 88 in the side trap compartments 68, the front trap compartment 74 and the rear trap compartment 76.

The minnows 88 may be removed from the side trap compartments 68, the front trap compartment 74 and the rear trap compartment 76 by opening the trap compartment door 50. This may be accomplished by unlatching the door latch 52 and pivoting the trap compartment door 50 on the door hinges 51. The minnow trap 1 may be tilted toward the front trap compartment 74 and shaken to facilitate removal of the minnows 88 from the minnow trap 1. The bait 84 may be removed from the central bait compartment 80 by opening the bait compartment door 56. Fresh bait 84 may be replaced in the central bait compartment 80 preparatory to subsequent use of the minnow trap 1.

It will be appreciated by those skilled in the art that the minnow trap 1 can be fabricated in various sizes using a variety of materials. In some embodiments, the minnow trap 1 may have a width of 24 inches, a depth of 10 inches and a height of 14 inches. Typical dimensions for the trap compartment door 50 may be 10 inches×4 inches. In other embodiments, however, the minnow trap 1 and trap compartment door 50 may have larger or smaller dimensions. In some embodiments, the minnow trap frame 2 may be fabricated of ¼ inch steel rods and the mesh covering 8, minnow entrance panels 40, side compartment panels 44, bait compartment front panel 45 and bait compartment rear panel 46 may be fabricated of ¼ inch wire mesh.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A minnow trap, comprising:
an elongated, rectangular minnow trap frame having opposite first and second frame ends;
a mesh covering disposed on the minnow trap frame, the mesh covering including a bottom trap panel, a top trap panel, a front trap panel and a rear trap panel;
a pair of spaced-apart, minnow-accessible side trap compartments in the minnow trap frame at the first and second frame ends, respectively, of the minnow trap frame;
the minnow trap frame including a center frame portion extending to and between the bottom trap panel and the top trap panel and to and between the front trap panel and the rear trap panel of the mesh covering;
a minnow-accessible front trap compartment and a minnow-accessible rear trap compartment in the center frame portion between the side trap compartments, the front trap compartment and the rear trap compartment disposed in spaced-apart relationship to each other;
the front trap compartment adjacent to the front trap panel and extending to and between the bottom trap panel and the top trap panel;
the rear trap compartment adjacent to the rear trap panel and extending to and between the bottom trap panel and the top trap panel; and
at least one central bait compartment in the center frame portion between and communicating with the side trap compartments and between and communicating with the front trap compartment and the rear trap compartment, the at least one central bait compartment configured to contain a supply of bait, the at least one central bait compartment extending to and between the bottom trap panel and the top trap panel and to and between the front trap compartment and the rear trap compartment, the at least one central bait compartment opening to the top trap panel.

2. The minnow trap of claim 1 further comprising at least one bait compartment door reversibly closing the at least one central bait compartment.

3. The minnow trap of claim 1 further comprising at least one trap compartment door reversibly closing at least one of the front trap compartment and the rear trap compartment.

4. The minnow trap of claim 1 further comprising at least one minnow entrance extending into at least one of the side trap compartments.

5. The minnow trap of claim 4 wherein the at least one minnow entrance comprises a pair of minnow entrances extending into the side trap compartments, respectively.

6. The minnow trap of claim 1 wherein the minnow trap frame comprises a pair of minnow entrance frame portions on opposite sides of the center frame portion, and wherein the pair of minnow entrance frame portions are in the side trap compartments, respectively.

7. The minnow trap of claim 6 further comprising at least one carrying handle carried by the minnow trap frame.

8. The minnow trap of claim 6 wherein the mesh covering renders each of the side trap compartments, the front trap compartment, and the rear trap compartment minnow-accessible.

9. A minnow trap, comprising:
an elongated, rectangular minnow trap frame having opposite first and second frame ends and including a center frame portion;
a mesh covering on the minnow trap frame, the mesh covering including a bottom trap panel, a top trap panel, a front trap panel and a rear trap panel;
the center frame portion of the minnow trap frame extending to and between the bottom trap and the top trap panel and to and between the front trap panel and the rear trap panel of the mesh covering, the center frame portion including:
a pair of bottom center frame members extending to and between the front trap panel and the rear trap panel at the bottom trap panel;
a pair of top center frame members extending to and between the front trap panel and the rear trap panel at the top trap panel;
a pair of front center frame members extending to and between the pair of bottom center frame members and the pair of top center frame members, respectively, at the front trap panel; and
a pair of rear center frame members extending to and between the pair of bottom center frame members and the pair of top center frame members, respectively, at the rear trap panel;

wherein the mesh covering includes a pair of side compartment panels extending in parallel, spaced-apart relationship to each other between the pair of bottom center frame members and the pair of top center frame members, respectively, and the pair of front center frame members and the pair of rear center frame members, respectively, of the center frame portion;

wherein the mesh covering includes a bait compartment front panel and a bait compartment rear panel extending between the pair of side compartment panels in parallel, spaced-apart relationship to each other;

a pair of spaced-apart, minnow-accessible side trap compartments in the minnow trap frame on opposite sides of the center frame portion;

a minnow-accessible front trap compartment and a minnow-accessible rear trap compartment in the center frame portion between and communicating with the side trap compartments, with the front trap compartment and the rear trap compartment disposed in spaced-apart relationship to each other;

the front trap compartment formed by and between the bottom trap panel, the top trap panel, the pair of side compartment panels and the bait compartment front panel;

the rear trap compartment formed by and between the bottom trap panel, the top trap panel, the pair of side compartment panels and the bait compartment rear panel; and at least one central bait compartment in the center frame portion, with the at least one central bait compartment between and communicating with the side trap compartments and between and communicating with the front trap compartment and the rear trap compartment, the at least one central bait compartment formed by and between the bottom trap panel, the pair of side compartment panels, the bait compartment front panel and the bait compartment rear panel.

10. The minnow trap of claim 9 further comprising at least one bait compartment door carried by the center frame portion and reversibly closing the at least one central bait compartment.

11. The minnow trap of claim 9 further comprising at least one trap compartment door carried by the center frame portion and reversibly closing at least one of the front trap compartment and the rear trap compartment.

12. The minnow trap of claim 9 further comprising a pair of minnow-accessible minnow entrances extending into and communicating with the side trap compartments, respectively.

13. The minnow trap of claim 12 wherein each of the minnow entrances comprises a minnow entrance frame portion extending from the minnow trap frame and a plurality of mesh minnow entrance panels on the minnow entrance frame portion.

14. The minnow trap of claim 9 further comprising at least one carrying handle carried by the center frame portion.

15. A minnow trap, comprising:
an elongated, rectangular minnow trap frame including:
a pair of spaced-apart minnow entrance frame portions; and
a center frame portion between the minnow entrance frame portions;
a mesh covering on the minnow trap frame, the mesh covering including a bottom trap panel, a top trap panel a front trap panel and a rear trap panel;
the center frame portion of the minnow trap frame extending to and between the bottom trap panel and the top trap panel and to and between the front trap panel and the rear trap panel of the mesh covering, the center frame portion including:
a pair of elongated, parallel, spaced-apart bottom center frame members extending between the front trap panel and the rear trap panel;
a pair of elongated, parallel, spaced-apart top center frame members extending between the front trap panel and the rear trap panel of the minnow trap frame in spaced-apart, parallel relationship to the bottom center frame members, respectively;
a pair of elongated, parallel, spaced-apart bottom bait compartment members extending between the bottom center frame members;
a pair of elongated, parallel, spaced-apart top bait compartment members extending between the top center frame members in parallel, spaced-apart relationship to the bottom bait compartment members, respectively;
a pair of parallel, spaced-apart side compartment panels extending to and between the bottom center frame members and the top center frame members, respectively, and to and between the front trap panel and the rear trap panel;
a bait compartment front panel and a bait compartment rear panel extending between the bottom bait compartment members and the top bait compartment members, respectively, and spanning the side compartment panels in parallel, spaced-apart relationship to each other;
a pair of elongated, parallel, spaced-apart front center frame members extending between the bottom center frame members and the top center frame members, respectively, at the front trap panel; and
a pair of elongated, parallel, spaced-apart rear center frame members extending between the bottom center frame members and the top center frame members, respectively, at the rear trap panel;

a pair of spaced-apart, minnow-accessible side trap compartments in the minnow trap frame between the center frame portion and the minnow entrance frame portions, respectively;

a pair of minnow entrances formed by the pair of minnow entrance frame portions, respectively, of the minnow trap frame, the pair of minnow entrances extending into and communicating with the side trap compartments, respectively;

a minnow-accessible front trap compartment and a minnow-accessible rear trap compartment in the center frame portion of the minnow trap frame between and communicating with the side trap compartments, with the front trap compartment and the rear trap compartment disposed in spaced-apart relationship to each other;

at least one trap compartment door carried by one of the front center frame members of the center frame portion of the minnow trap frame and reversibly closing the front trap compartment;

a central bait compartment in the center frame portion of the minnow trap frame, with the central bait compartment between and communicating with the side trap compartments and between and communicating with the front trap compartment and the rear trap compartment; and a bait compartment door carried by one of the top center frame members of the center frame portion of the minnow trap frame and reversibly closing the central bait compartment.

16. The minnow trap of claim 15 wherein the minnow trap frame comprises:
    an elongated bottom front frame member;
    an elongated top front frame member disposed in parallel, spaced-apart relationship with respect to the bottom front frame member;
    an elongated bottom rear frame member disposed in parallel, spaced-apart relationship to the bottom front frame member,
    an elongated top rear frame member disposed in parallel, spaced-apart relationship to the top front frame member,
    a pair of parallel, spaced-apart front side frame members connecting the top front frame member to the bottom front frame member;
    a pair of parallel, spaced-apart rear side frame members connecting the top rear frame member to the bottom rear frame member;
    a pair of parallel, spaced-apart bottom side frame members connecting the bottom rear frame member to the bottom front frame member; and
    a pair of parallel, spaced-apart top side frame members connecting the top rear frame member to the top front frame member.

17. The minnow trap of claim 16 wherein each of the pair of minnow entrance frame portions comprises a pair of bottom minnow entrance frame members extending from each corresponding one of the pair of bottom side frame members, a pair of top minnow entrance frame members extending from each corresponding one of the pair of top side frame members, and a minnow entrance frame ring terminating the pair of bottom minnow entrance frame members and the pair of top minnow entrance frame members, and further comprising a plurality of minnow entrance panels supported by each of the pair of minnow entrance frame portions.

\* \* \* \* \*